United States Patent
Tsay et al.

(10) Patent No.: US 6,192,430 B1
(45) Date of Patent: Feb. 20, 2001

(54) INNOVATIVE DUAL-CHANNEL SERIAL INTERFACE CIRCUIT SCHEME

(75) Inventors: Ching-yuh Tsay, Plano; Richard E. Downing, Allen; George Paul Eaves, Richardson; Craig Lance Dalley, Plano; Ian Lloyd Bower, Dallas, all of TX (US)

(73) Assignee: Texas Instruments Incorporated, Dallas, TX (US)

(*) Notice: Under 35 U.S.C. 154(b), the term of this patent shall be extended for 0 days.

(21) Appl. No.: 09/030,752

(22) Filed: Feb. 25, 1998

Related U.S. Application Data
(60) Provisional application No. 60/039,654, filed on Feb. 28, 1997.

(51) Int. Cl.[7] ............................... G06F 13/00; G06F 3/00
(52) U.S. Cl. ............................. 710/61; 360/51; 375/257; 375/200; 455/427; 710/7; 710/33; 710/128
(58) Field of Search ................................... 710/7, 33, 61, 710/69, 128; 360/51; 375/257, 200; 455/427

(56) References Cited

U.S. PATENT DOCUMENTS

| | | | | |
|---|---|---|---|---|
| 4,275,455 | * | 6/1981 | Bartlett | 364/130 |
| 4,617,642 | * | 10/1986 | Clark | 710/131 |
| 5,535,237 | * | 7/1996 | LaPadula, III et al. | 375/200 |
| 5,903,835 | * | 5/1999 | Dent | 455/427 |
| 5,912,924 | * | 6/1999 | Dreyer et al. | 375/257 |
| 5,917,668 | * | 6/1999 | Behrens et al. | 360/51 |

FOREIGN PATENT DOCUMENTS
357178534 * 11/1982 (JP).

OTHER PUBLICATIONS
"Microcomputers and Microprocessors—The 8080, 8085, and Z–80 programming, interfacing, and Troubleshooting" by John Uffenbeck.*

* cited by examiner

Primary Examiner—Thomas C. Lee
Assistant Examiner—Tammara Peyton
(74) Attorney, Agent, or Firm—W. Daniel Swayze, Jr.; Wade James Brady, III; Frederick J. Telecky, Jr.

(57) ABSTRACT

A mixed-signal processor (MSP) chip with a flexible serial interface which simultaneously accommodates two serial ports on a reduced number of pins. The pin definitions of these serial ports are configured to function well with several different external chips. Any two of these chips, or two of any one of these chips, may be used concurrently by the present MSP. When used with chips that require it, the present MSP chip provides a clock signal to each of these. When used with other chips, the MSP will can receive a clock signal from an external chip, and will then pass this signal through to any chip on the other of the two serial ports.

13 Claims, 6 Drawing Sheets

INNOVATIVE DUAL-CHANNEL SERIAL INTERFACE CIRCUIT SCHEME

This application claims priority under 35 USC §119(e)(1) of provisional application Ser. No. 60/039,654 filed Feb. 28, 1997.

BACKGROUND AND SUMMARY OF THE INVENTION

This application related to mixed-signal processing (MSP) systems, and in particular to serial interfaces to an MSP chip.

One important consideration of the design of any chip package is that of providing as much functionality as possible while requiring as small an area and as few external connections as possible. In chips with many or complex functions, many external pins are required to allow for all necessary control, power, and data signals. It is therefore desirable that any particular function be designed in such a way as to require as few pins as possible.

Another important consideration in the design of a processing system is flexibility of use. Each chip will necessarily be connected to other devices providing input, output, and control signals, so it is advantageous if the chip can accommodate as wide a range of peripheral devices as possible.

Flexible Serial Interface

This application presents a mixed-signal processor (MSP) chip with a flexible serial interface which simultaneously accommodates two serial ports on a reduced number of pins. The pin definitions of these serial ports are configured to function well with several different external chips. Any two of these chips, or two of any one of these chips, may be used concurrently by the present MSP. When used with chips that require it, the present MSP chip provides a clock signal to each of these. When used with other chips, the MSP can receive a clock signal from an external chip, and will then pass this signal through to any chip on the other of the two serial ports.

Particular advantages of the chip of the preferred embodiment include:

1) a minimum number of required pins (5 for two ports)
2) flexibility in the sampling rate (e.g. 7.2 KHz or 8.0 KHz)
3) flexibility in configuration (up to two interface chips in multiple configurations)
4) a minimum number of registers is required (e.g. two 16-bit data registers and one 5-bit register)
5) supports the use of two simultaneous channels.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1:
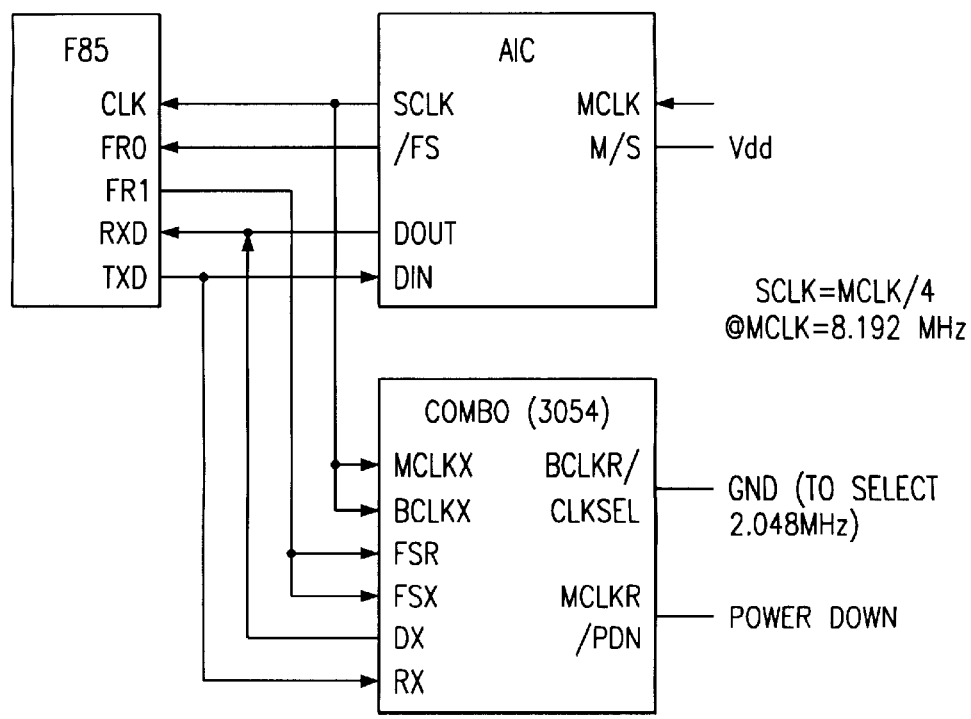
FIG. 1 illustrates a configuration wherein the present MSP chip is connected to both an AIC chip and a COMBO chip.
Figure 2:
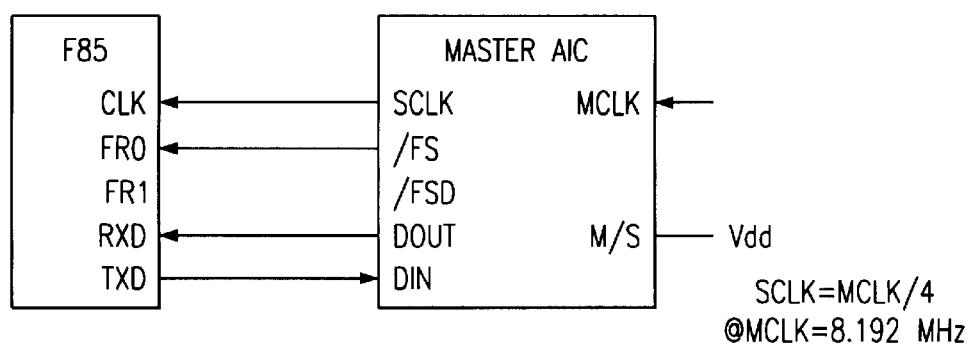
FIG. 2 illustrates a configuration wherein the present MSP chip is connected to an AIC chip.
Figure 3:
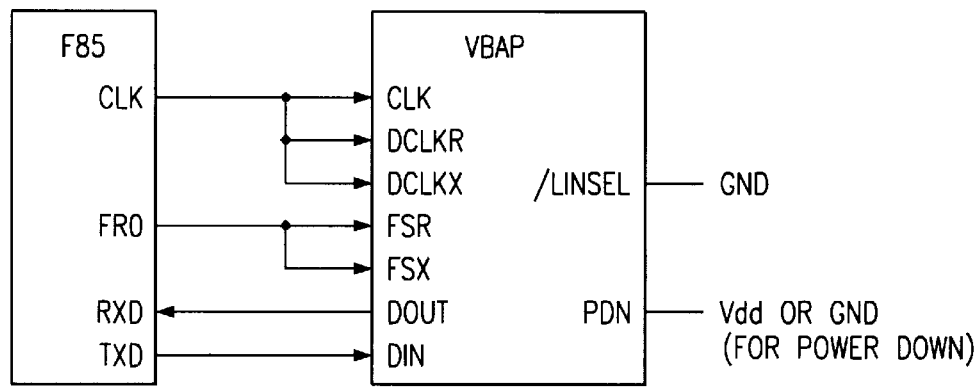
FIG. 3 illustrates a configuration wherein the present MSP chip is connected to a VBAP chip.
Figure 4:
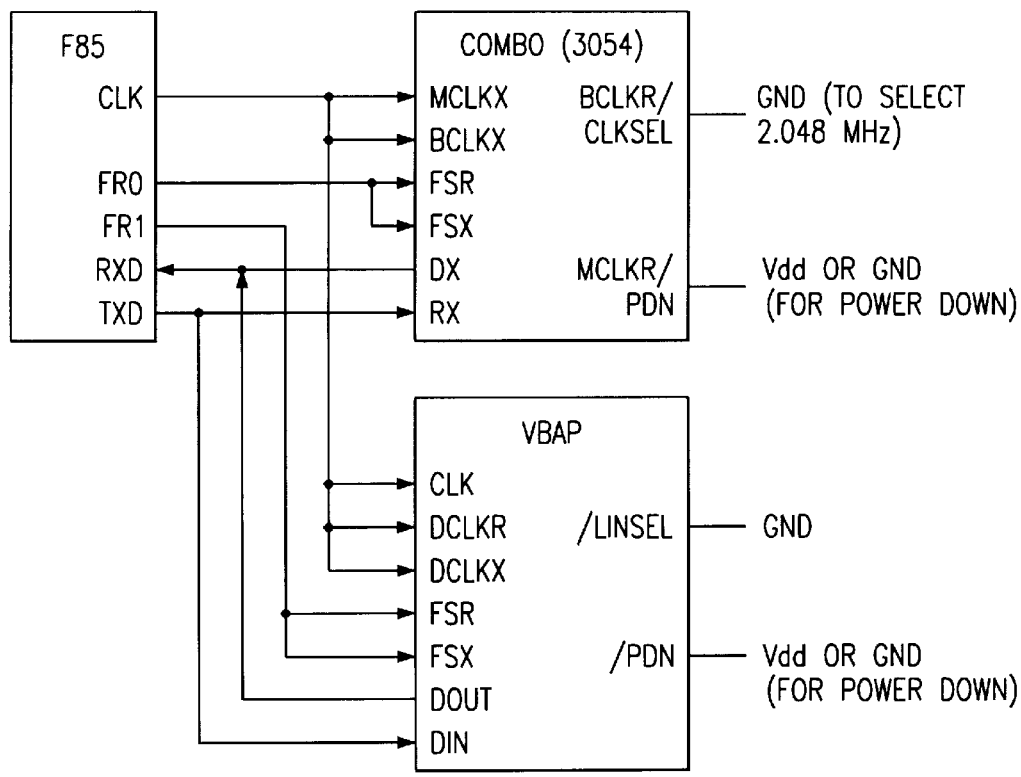
FIG. 4 illustrates a configuration wherein the present MSP chip is connected to both a COMBO chip and a VBAP chip.
Figure 5:
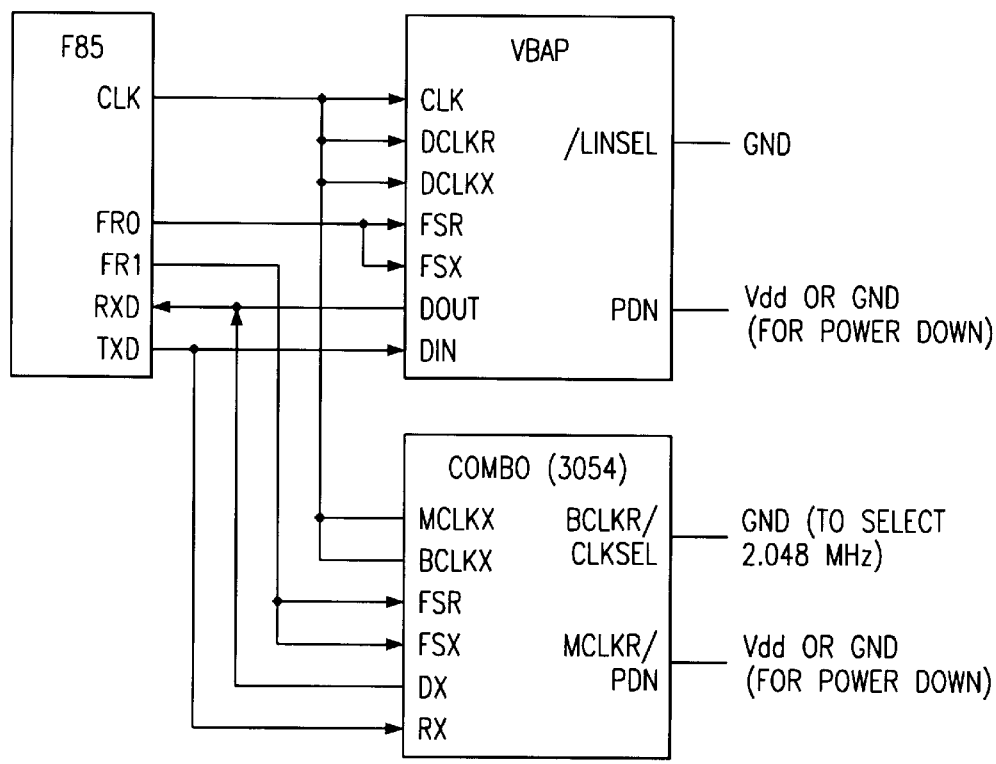
FIG. 5 illustrates a second configuration wherein the present MSP chip is connected to both a COMBO chip and a VBAP chip.
Figure 6:
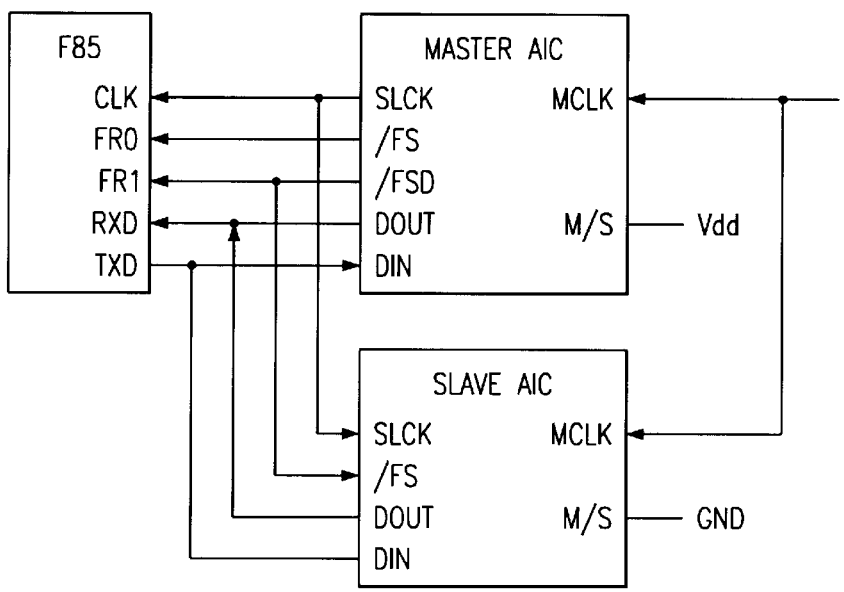
FIG. 6 illustrates a configuration wherein the present MSP chip is connected to two AIC chips.
Figure 7:
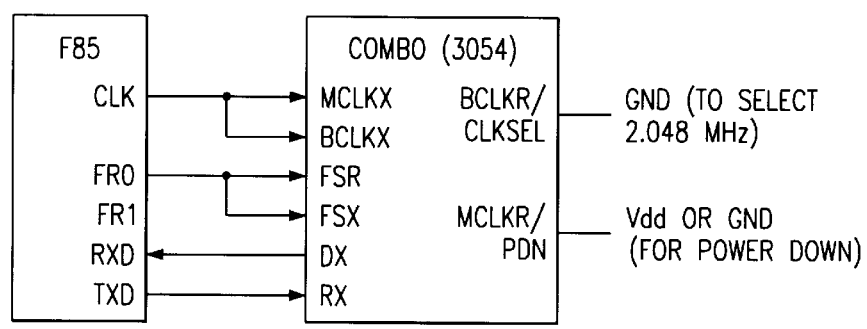
FIG. 7 illustrates a configuration wherein the present MSP chip is connected to a COMBO chip.
Figure 8:
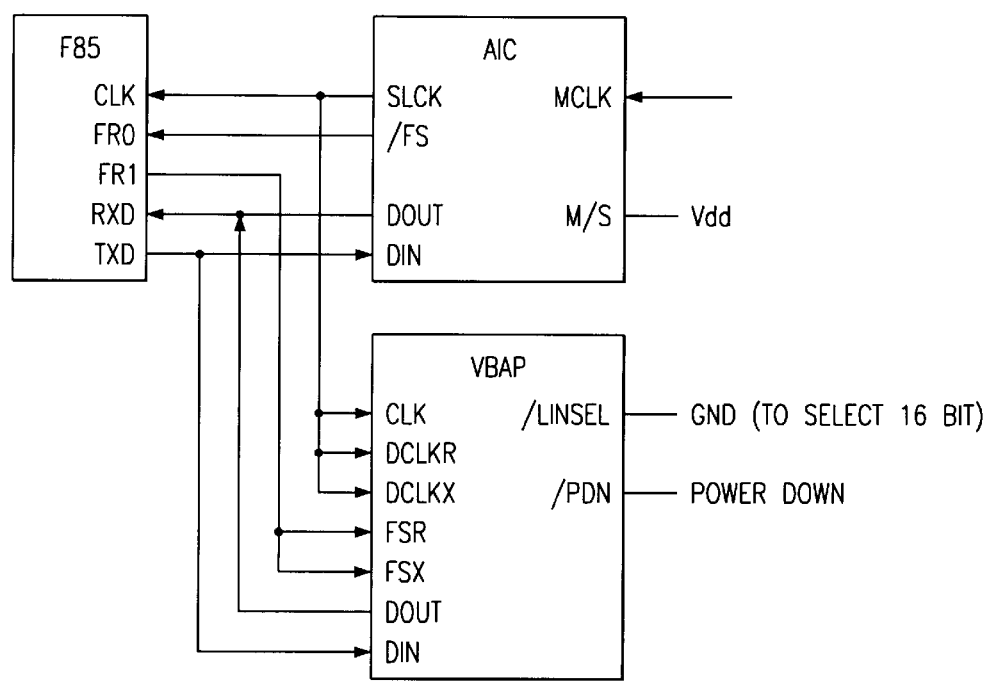
FIG. 8 illustrates a configuration wherein the present MSP chip is connected to both an AIC chip and a VBAP chip.
Figure 9:
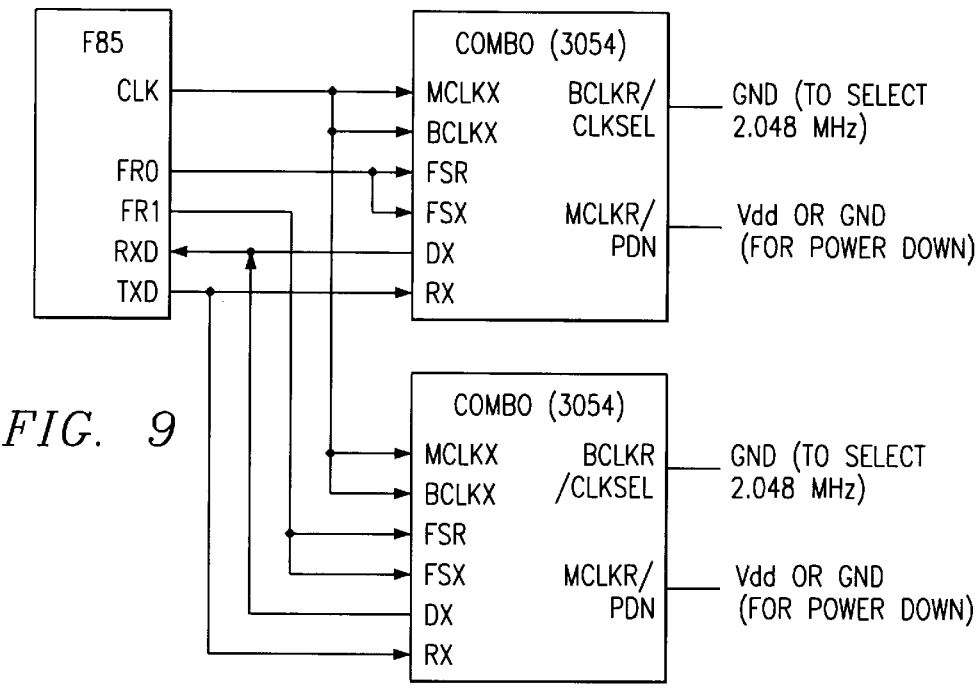
FIG. 9 illustrates a configuration wherein the present MSP chip is connected to two COMBO chips.
Figure 10:
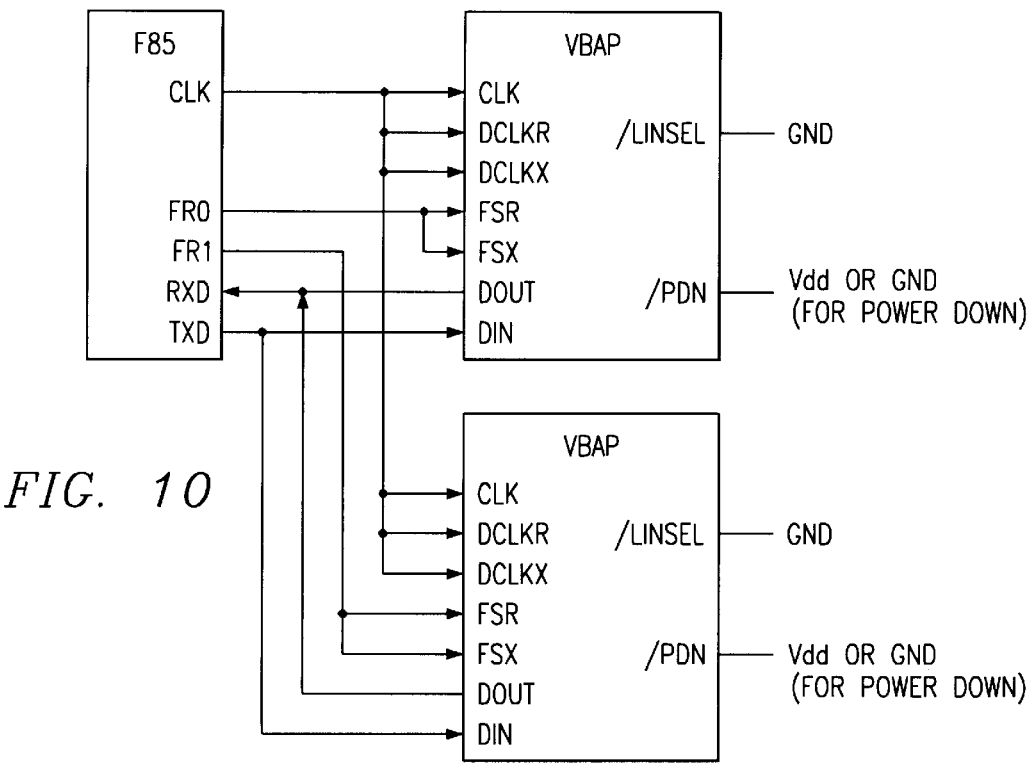
FIG. 10 illustrates a configuration wherein the present MSP chip is connected to two VBAP chips.

The numerous innovative teachings of the present application will be described with particular reference to the presently preferred embodiment (by way of example, and not of limitation).

This application presents a mixed-signal processor (MSP) chip (the MSP58F85) with a flexible serial interface which simultaneously accommodates two serial ports on a reduced number of pins. By utilizing a common clock signal for both ports, as well as common pins for data transmit and receive, the total number-of pins necessary for both ports is reduced to five. In addition to the clock, send data, and receive data pins, an additional pin is used for each port for a frame sync signal. The frame sync signal is used to distinguish the ownership of the data on the data pins between the two ports.

In addition to using a minimal number of pins, the chip also provides for a minimal number of registers necessary to administer the two serial ports. Only three registers are used; an input register, output register, and control register. By reducing the number of registers necessary for the serial interface circuit, the required chip size and complexity is reduced.

The chip is configured to communicate at different sampling rates depending on the settings of the serial port control register SCR. This provides additional flexibility in operation, and the sampling rate can be changed on the fly with a simple register setting. In the preferred embodiment, a single bit is used to indicate whether the MSP should sample at a rate of 7.2 KHz or 8.0 KHz.

The pin definitions of the F85 serial ports are configured to function well with several different analog interface chips, including the TLC320AC01C Single Supply Analog Interface Circuit (AIC), TCM320AC36/7 Voice-Band Audio Processors (VBAP) and TCM320AC54 Monolithic Serial Interface Combined PCM CODEC and Filter (COMBO) chips, all of which, and their respective data sheets, are hereby incorporated by reference. Any two of these chips, or two of any one of these chips, may be used concurrently by the F85. When used with the VBAP or COMBO (and not the AIC), the present MSP chip provides a clock signal to each of these. When used with an AIC, the AIC provides a clock signal to the F85, which the F85 will then pass through to any chip on the other of the two serial ports.

F85 serial ports have synchronized transmit & receive operations and support two sampling rates (7.2 KHZ & 8.0 KHZ) for up to two ports simultaneously, using only five external pins. F85 supports three distinctive analog interface chips;

AIC (TLC320AC01)—operating at master/stand-alone mode or master & slave modes if two AICs are used;

VBAP (TCM320AC36/37)—operating at linear coding and synchronized variable-data-rate timing mode;

COMBO (TCM320AC54)—operating at 2.048 MHZ synchronous long-frame sync mode.

F85 serial ports are software configured to operate with up to two of the three interface chips, with an exception that if AIC is present, at least one of the AIC's has to be connected to port 0. Once properly configured, F85 serial ports will automatically determine proper signal directions (input or output) and will control proper timing to maintain a sampling rate of 8 KHZ or 7.2 KHZ. Sample configurations of the F85 and various combination of the above interface chips are shown in FIGS. 1–10.

In addition to using a minimal number of pins, the chip also provides for a minimal number of registers necessary to administer the two serial ports. The three I/O mapped registers are the read-only Data Receive Register DRR, the write-only Data Transmit Register DXR, and the Serial Port Control Register SCR. The DRR and DXR are both 16 bit registers; the SCR in the preferred embodiment only requires 5 bits. Of course, the SCR may be implemented by a 16 bit register, with the eleven MSBs used for another purpose or simply left as don't-cares. Similarly, if less than 16 bits are needed for either of the data registers, the remaining MSBs may be regarded as don't-cares.

The two serial ports are connected using the following external pins:

1. SCLK (I/O/Z) for clocking both serial ports;
2. FR (I/O/Z) as frame sync for port 0;
3. FR1 (I/O/Z) as frame sync for port 1;
4. RXD (I/Z) received data pin for both ports;
5. TXD (O/Z) transit data pin for both ports.

F85 serial ports have synchronized transmit/receive operations, and support sampling rate equal or higher than 8 KHZ for up to two ports simultaneously. That is, the F85 is capable of multiplexing between two ports for each to operate at 8 KHZ minimum.

Chip Configuration Options

If an AIC chip is present in the system configuration, the F85 requires AIC to be the master; whenever two AICs are present, the first one (port 0) is designate as the master AIC while the second is slave. The master AIC has to be connected to port 0. The master AIC will generate SCLK and FR0 to both F85 and other analog interface chip, if available. The master will also be responsible for generating the FR1 for the slave AIC. When the slave is either a VBAP or a COMBO, F85 will generate FR1. When no AIC is used in the serial port configuration, F85 will generate SCLK (=2.048 MHZ), FR0 and FR1, such that the sampling rate on both ports are either 8 KHz or 7.2 KHz.

When two AIC are connected to the F85, or one stand-alone AIC is connected to the first serial port of F85, the AIC on the first port feeds the F85 a SCLK signal. See, e.g. FIGS. 2, 6, 7, and 8.

Whenever a transmit/receive session ends, the serial ports will generate a serial-port interrupt. A status bit in SCR needs to be read to determine which port is the active port at the time of interrupt. The data from DRR should be read and new data to DXR should be written within twenty (20) serial port clock cycles of serial port interrupt. The addresses of the three I/O mapped registers for serial ports are:

| Address (in decimal) | Register |
| --- | --- |
| (13) | DRR-Data Receive Register (Read Only); |
| (14) | DXR-Data Transmit Register (Write Only); |
| (15) | SCR-Serial Port Control Register. |

DRR and DXR are 16-bit data registers for received data and transmit data. If less than 16-bit data is used in the communications, MSB data are don't cares. For example, when communicating with COMBO, only bits 0–7 are meaningful data, the MSB are don't cares. Both DRR and DXR are reset to zero by Reset. SCR is defined as:

| | | |
| --- | --- | --- |
| bit 1,0: | | serial port 0 mode, |
| 00 | -> | off (default) |
| 01 | -> | COMBO; |
| 10 | -> | VBAP; |
| 11 | -> | AIC. |
| bit 3,2: | | serial port 1 mode, |
| 00 | -> | off (default) |
| 01 | -> | COMBO; |
| 10 | -> | VBAP; |
| 11 | -> | AIC. |
| bit 4: | | serial port 0 active (READ-ONLY) |
| 0 | -> | active frame is serial port 1; |
| 1 | -> | active frame is serial port 0. |
| bit 15–5: | | don't cares. |

Serial port 1 is automatically off if serial port 0 is not enabled.

Preferred System Overview

Figure 11:
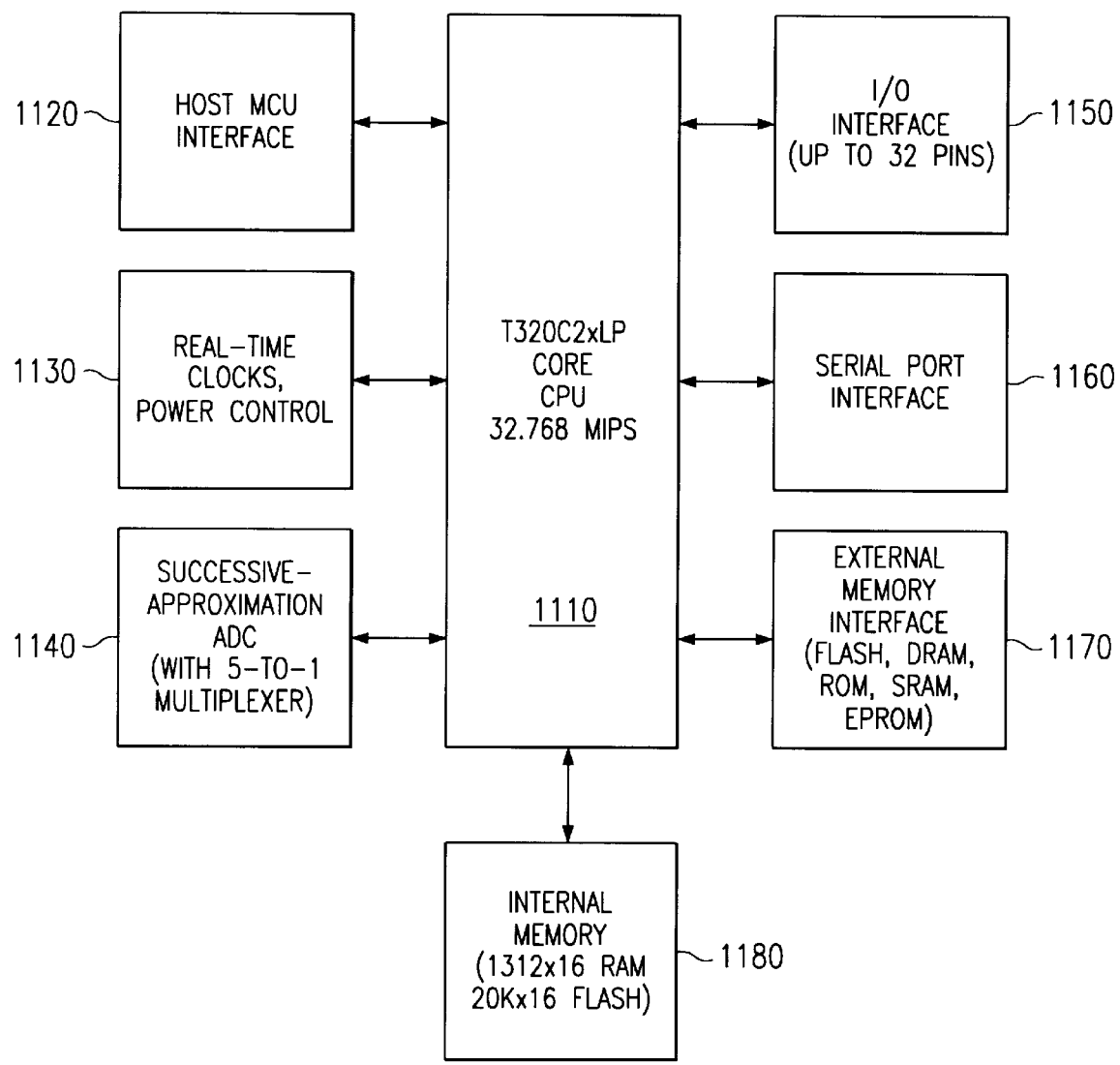
FIG. 11 illustrates a block diagram of a MSP chip according to a presently preferred embodiment.

The MSP58F85 has a DSP core, which performs both signal processing and control functions. To support high-speed processing, it has 20K words of internal program flash, and 1312 words of internal RAM. It also has a flexible clock control system, which allows power consumption to be reduced during the execution of routines that do not require high-speed processing. The data sheet, user's guide, and electrical specification of the MSP58F85 is hereby incorporated by reference. A simplified block diagram of the MSP58F85 is shown in FIG. 11.

The external memory interface (1170) supports SRAM, ROM, EPROM, DRAM, flash, and memory-mapped peripherals, allowing a wide range of system configurations with no external glue logic. The I/O -interface (1150) provides up to 52 general-purpose I/O pins. The host MCU interface (1120) provides an easy-to-use parallel interface to a host microprocessor, if one is needed.

The serial interface (1160) supports several analog interface chips for speech I/O. The successive-approximation ADC (1140) can be used for monitoring telephone line voltage, battery level, and other non-speech signals. The real-time clocks (1130) allow day/time stamping of messages, and the power control (1130) permits battery backup during power failure as well as permitting minimized power consumption under all conditions.

Other particular features of the MSP58F85 include:

T320C2xLP Core CPU
    32.768 MIPS T32OC2xLP core CPU (1110) (30.5 ns instruction cycle) at 5 Volts
    Source code compatible with TMS320C25
    Source code upwardly compatible with TMS32OC5x family of DSPs
    64K-word data memory space
    64K-word program memory space
    1312 16-bit words of internal DARAM (1180) (RAM that supports single cycle DMOV function)
    Power-down (IDLE) mode
    Scan-based emulation
    20K-word on-chip program flash (1180)
External Memory Interface
    Additional 16M-word alternate space
    Internal wait state generator
    Glue-less support for 8-bit and 16-bit SRAM, ROM, EPROM, and flash as well as 1-bit, 4-bit, and 16-bit DRAM and ARAM Automatic conversion of external data to 16-bit internal format
Supports up to 8M-bit flash and up to 16M-bit ARAM/DRAM without glue logic
Two RAS__ lines support 2 ARAMs/DRAMs simultaneously General-Purpose I/O Capability
Up to 32 pins of general I/O Enhanced Clock Control
Phase-locked loop (PLL) generates a 32.768 MHz clock
Power-down mode with real-time clock wake up for power consumption control
External crystal operates at 8.192 MHz Analog-to-Digital Converter
8-bit resolution low-frequency ADC with on-chip 5-to-1 analog multiplexer Host Interface
8-bit wide and 4-bit wide host interface options with internal read and write latches Serial Interface
Interfaces to a variety of analog interface chips for speech/modem signal control
Second frame synchronization pin permits use of two analog interface chips Serial Interface Signals
Data clock for analog interface chip

| Signal: | SCLK |
|---|---|
| Pin: | 21 |
| I/O/Z | |

A signal can be provided by the MSP58F85, or SCLK can be driven by external circuitry. Reset makes this pin high impedance. Core idle has no effect on any of the serial interface pins. They continue to clock and to collect data. The serial interface should be disabled before clock idle, to prevent leaving its pins in an active state.

Serial data in from analog interface chip

| Signal: | RXD |
|---|---|
| Pin: | 20 |
| I/Z | |

RXD is an input only during an active serial port session. Otherwise, it is a high-impedance pin. Reset makes this pin high impedance. Core idle has no effect on any of the serial interface pins. They continue to clock and to collect data. The serial interface should be disabled before clock idle, to prevent leaving its pins in an active state.

Serial data out to analog interface chip

| Signal: | TXD |
|---|---|
| Pin: | 18 |
| O | |

TXD is always an output pin. Core idle has no effect on any of the serial interface pins. They continue to clock and to collect data. The serial interface should be disabled before clock idle, to prevent leaving its pins in an active state.

Frame synchronization pin

| Signal: | FR |
|---|---|
| Pin: | 19 |
| I/O/Z | |

FR can be driven by MSP58F85 to interface with TCM320AC54 or TCM320AC36, or can be driven by TLC320AC01 or similar chip. Reset makes this pin high impedance. Core idle has no effect on any of the serial interface pins. They continue to clock and to collect data. The serial interface should be disabled before clock idle, to prevent leaving its pins in an active state.

Memory address pin/B port pin/second frame synchronization pin

| Signal: | A19/B4/FR1 |
|---|---|
| Pin: | 31 |
| I/O/Z | |

This pin can be programmed as address pin A19, general-purpose I/O pin B4, or frame synchronization pin FR1. A19 is the most significant address bit—it is used only for alternate space accesses. A19 is always an output pin.

If the A19 function is not required, this pin can be programmed as pin B4 of general-purpose I/O port B. B4 can be programmed to be either an input pin or an output pin. Unused B port pins that are configured as inputs should be tied to either VSS or VDD.

If the B4 function is not required, this pin can be programmed as FR1—a frame synchronization pin for the second analog interface chip. FR1 can be a high-impedance pin, an input pin, or an output pin, depending on the interface mode that is selected with the SCR I/O-mapped register (see Table 2-14).

This pin is not affected by core idle (i.e., when the I bit of CLKCTL is zero and an IDLE command is executed) or clock idle (i.e., when the I bit of CLKCTL is one and an IDLE command is executed), regardless of which pin function is selected. However, the serial port needs to be disabled before clock idle.

MCU interface pin/B port pin/second frame synchronization

| Signal: | MCINT__/B0/FR1 |
|---|---|
| Pin: | 9 |
| I/O/Z | |

This pin can be programmed as MCU interrupt pin MCINT__, general-purpose I/O pin B0, or frame synchronization pin FR1. MCINT__(MCU interrupt) is an output pin. It is used in conjunction with three other MCU interface pins: MCRD__, MCWR__, and MCACK__. B0 is the least significant pin of general-purpose I/O port B. B port pins can be programmed as either input pins or output pins. Unused B port pins that are configured as inputs should be tied to either VSS or VDD.

FR1 is a frame synchronization pin for the second analog interface chip. FR1 can be a high-impedance pin, an input pin, or an output pin, depending on the interface mode that is selected with the SCR I/O-mapped register (see Table 2-14).

This pin is not affected by core idle or clock idle, regardless of which pin function is selected. However, the serial port needs to be disabled before clock idle.

Serial Interface Registers
  Serial Port Receive Register DRR
  DRR is a 16-bit read-only register that is I/O mapped to address Dh. An 8-bit or 16-bit value received from an external analog interface chip or combo is placed in DRR. When the serial port is operating in 8-bit mode, the data is received into the lower 8 bits of DRR and the upper 8 bits are undetermined. When the serial port interrupt occurs, the value in DRR has just been shifted into the serial port and needs to be read. Since the DRR register is single buffered, it should be read as soon as possible after the serial port interrupt. The DRR value is shifted in with the FR or FR1 signal. The DRR value must be read at least 20 serial port clock cycles before either FR or FR1 becomes active again.
  Note that reading from or writing to DRR must be done via software. Using the debugger to view or modify DRR may cause incorrect results.
  Serial Port Transmit Register DXR
  DXR is a 16-bit write-only register that is I/O mapped to address Eh. DXR contains an 8-bit or 16-bit value to be sent to an external analog interface chip or combo. When the serial port is operating in 8-bit mode, the data is transmitted from the lower—8 bits of DXR and the upper 8 bits are ignored. When the serial port interrupt occurs, the value in DXR has just been shifted out of the serial port and needs to be reloaded. Since the DXR register is single buffered, it should be reloaded as soon as possible after the serial port interrupt. The DXR value is shifted out with the FR or FR1 signal. The DXR value must be loaded at least 20 serial port clock cycles before either FR or FR1 becomes active.
  Note that reading from or writing to DRR must be done via software. Using the debugger to view or modify DRR may cause incorrect results.
  Serial Port Control Register SCR
  SCR is a 5-bit register that is I/O mapped to address Fh. SCR is a register that configures the serial port. Bits 0 through 3 are read/write bits, and bit 4 is a read-only bit.

| Serial Port Control Register (SCR) Bit Assignments | |
| --- | --- |
| Pin | Function |
| 15–5 | Reserved |
| 4 | P0A |
| 3 | P1M1 |
| 2 | P1M0 |
| 1 | P0M1 |
| 0 | P0M0 |

P0M0 and P0M1 are the port 0 mode selection bits. They determine the port 0 mode, as shown below:

| Mode: | 00 | off | |
| --- | --- | --- | --- |
| | 01 | TCM320AC54 | (COMBO) |
| | 10 | TCM320AC36/37 | (VBAP) |
| | 11 | TLC320AC01 | (AIC) |

P1M0 and P1M1 are the port 1 mode selection bits. These bits perform the same function for port 1 that P0M0 and P0M 1 perform for port 0. Note that programming serial port 0 to be off also causes serial port 1 to be off, regardless of the setting of the P1M0 and P1M1 bits.

Table 2-14 defines the serial port pin directions for various settings of the SCR register. The pin directions listed in the table apply whether or not the MSP58F85 is in an IDLE mode. They also apply whether or not the serial port interface has been enabled with the SON bit.

| Serial Port Pin Directions Based on SCR Settings | |
| --- | --- |
| P0M0/P0M1 = 00 | |
| SCLK Hi-Z | |
| FR | Hi-Z |
| FR1 | Hi-Z* |
| RXD | Hi-Z |
| TXD | Output*** |
| P0M0/P0M1 = 01 or 10 | |
| P1M0/P1M1 = 00 | |
| SCLK Output | |
| FR | Output |
| FR1 | Hi-Z* |
| RXD | Input/Hi-Z** |
| TXD | Output*** |
| P0M0/P0M1 = 11 | |
| P1M0/P1M1 = 00 | |
| SCLK Input | |
| FR | Input |
| FR1 | Hi-Z* |
| RXD | Input/Hi-Z** |
| TXD | Output*** |
| P0M0/P0M1 = 01 or 10 | |
| P1M0/P1M1 = 01 or 10 | |
| SCLK Output | |
| FR | Output |
| FR1 | Output |
| RXD | Input/Hi-Z** |
| TXD | Output*** |
| P0M0/P0M1 = 11 | |
| P1M0/P1M1 = 10 or 01 | |
| SCLK Input | |
| FR | Input |
| FR1 | Output* |
| RXD | Input/Hi-Z** |
| TXD | Output*** |
| P0M0/P0M1 = 11 | |
| P1M0/P1M1 = 1 | |
| SCLK Input | |
| FR | Input |
| FR1 | Input* |
| RXD | Input/Hi-Z* |
| TXD | Output*** |

*The direction of FR1 only applies if either A19/B4/FR1 or MCINT_/BO/FR1 has been programmed to be the FR1 pin.
**RXD is an input only during an active serial port session. Otherwise, it is a high-impedance pin.
***The output level of TXD after reset is 0. During a serial port session, TXD contains the data being transferred. Otherwise, the output level of TXD equals the level of the last bit that was transmitted out of the serial port.

P0A is high when port 0 is the port that has caused the latest interrupt, and low when port 1 has caused the latest interrupt. Reset sets the value in this register to 0h.

System Clock
  The T320C2xLP core in the MSP58F85 can be clocked at six different rates. The core is clocked by the system clock, which is provided by either the internal reference oscillator divided by two or by the PLL. In addition to clocking the core, -the system clock also clocks the following on-chip peripherals:
  Timer—The timer is clocked at the system clock rate.
  Memory interface circuitry—Memory interface timing is based on the system clock rate. The refresh request clock, however, is derived from the reference oscillator.
  Serial port—The serial port clock is based on the system clock (see Table 2-30). If the serial port is being operated with an AIC connected to serial port 0, the SP8K bit of the CLKCTL register should equal 1. Otherwise, SP8K should equal 1 if a sampling rate of approximately 8 kHz is desired, and SP8K should equal 0 if a sampling rate of approximately 7.2 kHz is desired. The serial port sampling rate is equal to the Serial Port Clock Rate divided by 256.

When an AIC is being used, the AIC must be programmed to meet this constraint.

| Serial Port Clock Rate Selections | |
|---|---|
| System Clock Rate | 4.096 MHz |
| SP8K=1 and SON=1* | Note A |
| SP8K=0 and SON=1* | Note A |
| SON=0 | Note A |
| System Clock Rate | 8.192 MHz |
| SP8K=1 and SON=1* | Note A |
| SP8K=0 and SON=1* | Note A |
| SON=0 | Note A |
| System Clock Rate | 16.384 MHZ |
| SP8K=1 and SON=1* | 2.048 MHZ |
| SP8K=0 and SON=1* | 1.862 MHz |
| SON=0 | Note A |
| System Clock Rate | 20.480 MHz |
| SP8K=1 and SON=1* | 2.048 MHz |
| SP8K=0 and SON=1* | 1.862 MHz |
| SON=0 | Note A |
| System Clock Rate | 24.576 MHz |
| SP8K=1 and SON=1* | Note A |
| SP8K=0 and SON=1* | Note A |
| SON=0 | Note A |
| System Clock Rate | 32.768 MHz |
| SP8K=1 and SON=1* | 2.048 MHz |
| SP8K=0 and SON=1* | 1.820 MHz |
| SON=0 | Note A |
| System Clock Rate | 40.96 MHz |
| SP8K=1 and SON=1* | 2.048 MHz |
| SPBK=0 and SON=1* | 1.862 MHz |
| SON=0 | Note A |

* The values for system clock rate and serial port clock rate assume an external crystal or clock source of 8.192 MHz.
Note A: No clocks are sent to the serial port circuitry in this mode. The serial port cannot be used in this mode.

Serial Port Interfacing

The MSP58F85 has two serial ports with the following external pins:
1. SCLK (I/O/Z) for clocking both serial ports;
2. FR (I/O/Z) as frame synchronization pin for port 0;
3. FR1 (I/O/Z) as frame synchronization pin for port 1;
4. RXD (I/Z) receive data pin for both ports;
5. TXD (O) transmit data pin for both ports.

The MSP58F85 is designed to support three analog interface chips:
1. TLC320AC01(AIC)—Operates in master/standalone mode or master and slave modes when two AICs are used. The AIC is a high quality, higher cost chip used for modem applications.
2. TCM320AC36/37 (VBAP)—Operates in linear coding (16-bit data) and synchronized variable-data-rate timing mode. The VBAP offers single-supply operation at a lower cost than the AIC, with quality more than adequate for voice applications.
3. TCM320AC54—Operates at 2.048 MHz synchronous long-frame sync mode. The TCM320AC54 uses two supplies (−5 Volts and +5 Volts), but it has a lower cost than the VBAP.

The MSP58F85 can also support many other analog interface chips that have compatible timing and interface requirements.

The MSP58F85 serial ports have synchronized transmit/receive operations, and support a sampling rate of 7.2 kHz or 8 kHz. Higher sampling rates are possible when using the AIC if an external frame synchronization signal and data clock are provided.

In order to interface with two external devices, either A19/B4/FR1 or MCINT_/B0/FR1 must be programmed as the FR1 pin. Please note that when the serial port is communicating with two external devices, both devices must be sampled at the same rate.

Interfacing With the VBAP or the TCM320AC54 (COMBO)

Interfacing with the VBAP (TCM320AC36) or the TCM320AC54 is very simple. Selecting the VBAP and/or the TCM320AC54 with the SCR I/O-mapped register sets the FR, FR1 (if selected), and SCLK pins as outputs with the proper timing to have a 7.2 kHz or 8 kHz sampling rate. The sampling rate is determined by the settings of the SP8K, CLK0, CLK1, and CLK2 bits of the CLKCTL register.

Interfacing With the AIC

Interfacing with the AIC is somewhat more complex. The AIC must be used with an external, customer-supplied clock source. If an AIC is used in the system, port 0 must be connected to an AIC. A second AIC can be used on port 1, but it is not possible to use an AIC on port 1 and a VBAP or a TCM320AC54 on port 0.

The MSP58F85 requires an AIC to be the master whenever it is present in the system. If there are two AICs, the one on port 0 is the master AIC and the second one is the slave. The master AIC generates a clock and a frame synchronization pulse to both the MSP58F85 and the other AIC, if present. When the slave is either a VBAP or a TCM320AC54, the MSP58F85 generates FR1.

When using an AIC with either a VBAP or a TCM320AC54, the FR1 signal goes active 128 serial port clock periods after FR goes active. As a result, the AIC's phase adjustment mode is not supported when using an AIC with either a VBAP or a TCM320AC54.

I/O-Mapped Registers Associated With the Serial Ports

DRR and DXR are 16-bit data registers for receiving data and transmitting data, respectively. The serial ports can operate in either 16-bit mode or 8-bit mode. Interfacing with the TCM320AC54 is done in 8-bit mode, and interfacing with the VBAP or the AIC is done in 16-bit mode. If the serial ports have been programmed for 8-bit mode, the most significant 8 bits of DRR are undetermined and the most significant 8 bits of DXR are ignored.

Whenever a transmit/receive session ends, the serial ports generate a serial port interrupt. A status bit in the SCR register needs to be read to determine which port is the active port at the time of the interrupt.

SCR is also used to select the external device(s) with which the serial port will interface. CLKCTL determines whether or not the on-chip serial port circuitry is clocked, and if it is clocked, determines the rate at which it is clocked. BCTL allows A19/B4/FR1 or MCINT_/B0/FR1 to be selected as an FR1 pin. RAMCTL determines whether or not the serial port circuitry has been enabled.

The I/O-mapped registers that affect the serial ports are listed in this table.

| I/O-Mapped Registers Associated with the Serial Ports | | |
| --- | --- | --- |
| I/O Address (Hex) | Name | Description |
| D | DRR | Data Receive Register |
| E | DXR | Data Transmit Register |
| F | SCR | Serial Port Control Register |
| 11 | CLKCTL | Clock Control Register |
| 16 | BCTL | Port B & D Control Reg. |
| 17 | RAMCTL | Refresh and RAS1_ Mode Control Register |

Serial Ports and Reset

The following sequence should be followed after the MSP58F85 has been reset:

1. Set the system clock to 16 MHz, 20 MHz, 32 MHz, or 40 MHz.
2. Set the SP8K bit appropriately.
3. Select A19/B4/FR1 or MCINT_/B0/FR1 as the FR1 pin, if needed.
4. Set the SON bit of the RAMCTL register to a 1.
5. Wait 2 microseconds.
6. Program the SCR register to interface with the appropriate serial port device(s).

Because the SCLK and FR pins are placed in a high-impedance mode upon reset, it is strongly recommended that this sequence be followed as soon as possible after reset.

Serial Ports and Clock Control

Before changing the speed of the system clock or causing the MSP58F85 to enter an IDLE mode, the following sequence must be followed if the external serial port device(s) is (are) going to be powered off:

1. Write a 0 to the DXR register.
2. Wait for a serial port interrupt. If a 0 is the last value that was transmitted by the serial port before being disabled, this will cause a 0 to remain on the TXD pin.
3. Write a 0 to the SCR register.
4. Write a 0 to the SON bit of the RAMCTL register.
5. Wait 2 microseconds.
6. Now the system clock speed can be changed or the MSP58F85 can enter an IDLE mode.

Before changing the speed of the system clock or causing the MSP58F85 to enter an IDLE mode, the following sequence must be followed if the external serial port device(s) is (are) going to remain powered on:

1. Write a 0 to the SCR register.
2. Write a 0 to the SON bit of the RAMCTL register.
3. Wait 2 microseconds.
4. Now the system clock speed can be changed or the MSP58F85 can enter an IDLE mode.

| Refresh and RAS1_ Mode Control Register RAMCTL Refresh and RAS1_ Mode Control (RAMCTL) Bit Assignments | | | |
| --- | --- | --- | --- |
| Bit | Assgn. | Bit | Assgn |
| 15 | x16 | 7 | S1P |
| 14 | H4 | 6 | S1I |
| 13 | S0A | 5 | AOFF |
| 12 | S0D | 4 | SON |
| 11 | S0P | 3 | CTLOFF |
| 10 | S0I | 2 | RAS1ON |
| 9 | S1A | 1 | RAS1EN |
| 8 | S1D | 0 | RD |

RAMCTL is a 16-bit read/write register that is I/O mapped to address 17h. The x16 bit, if a 1, causes all DRAM spaces to be accessed with a 16-bit wide data bus, regardless of whether the narrow or wide option was chosen for those spaces in the MEMTYPE register. This makes it possible to have wider ARAM/DRAM arrays for improved access time. The x16 bit, if a 0, allows narrow DRAM spaces to be accessed with a 1-bit wide data bus and wide DRAM spaces to be accessed with a 4-bit wide data bus.

The x16 bit should not be programmed as a 1 if the MCU interface is being used. 16-bit wide memory interfacing is incompatible with usage of the MCU interface.

H4 is ignored unless the MCU bit of the BCTL I/O-mapped register equals 1. If the MCU bit is a 1 and the H4 bit is a 1, the host interface uses only four bits of the D port, bits D8 to D11. This allows bits D0 to D7 and D12 to D15 to be used for memory interfacing or for general-purpose I/O. If MCU is a 1 and H4 is a 0, the host interface uses eight bits of the D port, bits D8 to D15. This allows bits D0 to D7 to be used for memory interfacing or for general-purpose I/O.

S0A high causes SELECT0_ to go low when the alternate space is accessed. S0D high causes SELECT0_ to go low when external data space is accessed. S0P causes SELECT0_ to go low when the external program space is accessed. S0I high causes SELECT0_ to go low when the external I/O space is accessed. The S1 bits (S1A, S1D, S1P, and S1I) perform the same functions for the SEL1_ pin. CAS_/SEL1_ is configured as SEL1_ by programming each memory space to be standard.

If any of the memory spaces are programmed to be dynamic, CAS_/SEL1_ is configured as CAS_ and the S1 bits are ignored. The AOFF bit, if a 0, enables A0 to A7 as address bus output pins. When a 1, it makes these pins high impedance. The AOFF bit is reset by device reset. The SON bit, when reset, disables the serial ports. If the SON bit is set, the serial ports are enabled and their mode of operation is controlled by the SCR register. The SON bit is reset by device reset.

The CTLOFF bit, if a 0, makes the CAS_/SEL1_, RAS_/RE_, WE_, and SELECT0_ pins be outputs. When the CTLOFF bit is a 1, it makes these pins high impedance. The CTLOFF bit is reset by device reset. The RD bit, when a 1, causes a refresh request to be generated every 64 cycles of the external clock (CLKIN). This gives a 128 kHz refresh rate, which is suitable for many ARAMs. A 0 in the RD bit causes a refresh request every 128 cycles of the external clock. This gives a 64 kHz refresh rate, which is suitable for many DRAMs. The MSP5gF85 supports CAS_-before-RAS_ refresh.

The RAS1EN and RAS1ON bits provide the control necessary to allow accessing two DRAMs with no external glue logic. If only one DRAM is being used, the MSP58F85 RAS_ pin should be connected to the DRAM RAS_ pin, and RAS1EN and RAS1ON should both equal 0. If two DRAMs are being used, one DRAM should have its RAS_ pin connected to the MSP58F85 RAS_ pin and the other DRAM should have its RAS pin connected to the MSP58F85 RAS1_ pin. In addition, RAS1EN should always equal 1, RAS1ON should equal 1 when reading from or writing to the RAS1_ DRAM, and RAS1ON should equal 0 when reading from or writing to the RAS_ DRAM. RAS1EN, when a 1, selects the A18/B5/RAS1_ pin to function as a RAS1_ pin. This causes both RAS_and RAS1_ to be asserted low during refresh. When RAS1EN is a 0, RAS_ is asserted low during refresh but RAS1_ is not. RAS1EN overrides the setting of the B5D bit in the BCTL register. RAS1EN is cleared by device reset.

If both RAS1ON and RAS1EN are 1, RAS1_ is active for reads and writes to any memory space mapped to DRAM in the MEMTYPE register. When one of these memory spaces is accessed, RAS1_ goes low but RAS_ does not. If RAS1ON is a 0, RAS_ goes low during DRAM accesses but RAS1_ does not. RAS1ON is cleared by device reset.

Port B and D Control Register BCTL

BCTL is a 16-bit read/write register that is I/O mapped to address 16h. BCTL determines whether B port pins serve as general-purpose I/O pins or whether they serve other functions. Also, one bit of BCTL determines whether the D port is used for memory interfacing.

| Bit | Assgn. | Bit | Assgn |
|---|---|---|---|
| 15 | B15D | 7 | B7D |
| 14 | B14D | 6 | B6D |
| 13 | B13D | 5 | B5D |
| 12 | B12D | 4 | B4D |
| 11 | B11D | 3 | FR1B |
| 10 | B10D | 2 | FR1A |
| 9 | B9D | 1 | MCU |
| 8 | B8D | 0 | NOMEM |

| Programming A19/B4/FR1 | |
|---|---|
| Programmed Function | B4 |
| BCTL Bit B4D | 0 |
| BCTL Bit FR1A | 0 |
| Programmed Function | FR1 |
| BCTL Bit B4D | 0 |
| BCTL Bit FR1A | 1 |
| Programmed Function | A19 |
| BCTL Bit B4D | 1 |
| BCTL Bit FR1A | 0 |
| Programmed Function | FR1 |
| BCTL Bit B4D | 1 |
| BCTL Bit FR1A | 1 |

Clock Control Register CLKCTL

CLKCTL is an 11-bit read/write register that is I/O mapped to address 11h. Controls clock speed and power down of the MSP58F85. Also contains 4 bits used to control wait states.

| Clock Control Register Bit Assignments | | | |
|---|---|---|---|
| Bit | Assgn. | Bit | Assgn |
| 15 | Res. | 7 | W1A |
| 14 | Res. | 6 | SP8K |
| 13 | Res. | 5 | I |
| 12 | Res. | 4 | PLLSEL |
| 11 | Res. | 3 | PLLAT5 |
| 10 | W3 | 2 | CLK2 |
| 9 | W2 | 1 | CLK1 |
| 8 | W1B | 0 | CLK0 |

W3, when set, causes the wait states selected in the MEMTYPE register to be doubled. If W3 is cleared, the wait states are not doubled. For example, if 4 wait states are programmed for the alternate space in the MEMTYPE register and W3 equals 1, 8 wait states are used. If 4 wait states are programmed for the alternate space in the MEMTYPE register and W3 equals 0, 4 wait states are used.

W2, when set, enables 1 wait state after the rising edge of WE_ before the address goes invalid. When W2 is cleared, the address goes invalid at approximately the same time as WE_ goes high. This wait state is provided for devices, such as some flash memories, that require a 10 ns hold time on address valid after the rising edge of WE_. W1A and W1B have three valid states and control wait states for data out enable. If W1A and W1B are both 0, data out is enabled as soon as possible. If W1B is 0 and W1A is 1, data out is held off for one clock cycle. If W1B is 1 and W1A is 0, data out is held off for two clock cycles. All other signals come out on the normal timings. This mode is provided for chips that have a slow timing on disabling their output buffers. With some external memory and peripheral devices, these wait states are necessary to avoid data bus conflicts. The setting W1A=W1B=1 is reserved.

When SP8K is a 1 and the core is running at 16 MHz, 20 MHz, 32 MHz, or 40 MHz, the serial port sampling rate is approximately 8 kHz. When SP8K is a 0 and the core is running at 16 MHz, 20 MHz, 32 MHz, or 40 MHz, the serial port sampling rate is approximately 7.2 kHz.

When I equals 0, the execution of an IDLE instruction shuts off the clocks to the processor core, but the external clock oscillator continues to run. When I equals 1, the execution of an IDLE instruction shuts off the external clock oscillator and the clocks to the processor core. Throughout this document, I=0 idle mode is referred to as core idle, and I=1 idle mode is referred to as clock idle. The MSP58F85 can only be restarted from clock idle by the XDS510 development tool or by a valid RS_ or INT0_ pulse.

PLLSEL, when reset, causes the system clock to be provided by the internal reference oscillator divided by two. PLLSEL, when set, causes the system clock to be provided by the PLL unless CLK0, CLK1, and CLK2 all equal zero. If CLK0, CLK1, and CLK2 all equal zero, the system clock is provided by the internal reference oscillator divided by two.

The rate of the PLL clock is determined by the CLK0, CLK1, and CLK2 bits. If CLK0, CLK1, and CLK2 are all 0, the PLL is powered off. The following table describes the effects of the PLLSEL, CLK0, CLK1, and CLK2 bits.

PLLAT5 is high for cases when the PLL is turned on and the power supply is at a nominal 5 Volts. PLLAT5 should be low for cases when the PLL is on and the voltage is at a nominal 3 Volts. The PLLAT5 bit should be changed only when the PLL has been powered off by the CLK0, CLK1, and CLK2 bits.

Reset sets the value in this register to 0h. Clock and core idle have no effect on this register, although this register does control clock and core idle.

According to a disclosed class of innovative embodiments, there is provided a circuit for serial communications, comprising: a first data register connected to an input line, said input line being operatively connected to receive data from a first data port and a second data port; a second data register connected to an output-line, said output line being operatively connected to send data to said first and second data ports; a clock line connected to said first and second data ports; first and second control signals connected to said first and second data ports; and a control circuit connected to selectably control whether data is being sent to and received from said first port or said second port.

According to another disclosed class of innovative embodiments, there is provided a digital signal processing system comprising: a first input device; a second input device; and a signal processing device having a data input line connected to an output of each of said first and second input devices; a data output line connected to an input of each of said first and second input devices; a first synchronization line connected to a synchronization pin of at least one of said first and second input devices; a second synchronization line connected to a synchronization pin of at least one of said first and second input devices; and a clock signal connected to a clock pin of each of said input devices; wherein said signal processing device sends and receives data from both of said input devices.

According to another disclosed class of innovative embodiments, there is provided a serial communications method, comprising the steps of: (A.) providing a processing system; (B.) providing first and second input devices connected to said system using common input and output connections; (C.) connecting said system to said first input device using a first control signal and to said second input device using a second control signal; (D.) receiving data into said system on said input connection; (E.) associating said data with said first or second input device according to the state of said first and second control signals.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

What is claimed is:

1. A multi-chip signal processing system comprising:
  a first input device;
  a second input device; and
  a signal processing device having
    a data input line connected to an output of each of said first and second input devices;
    a data output line connected to an input of each of said first and second input devices;
    a first synchronization line connected to a synchronization pin of at least one of said first and second input devices;
    a second synchronization line connected to a synchronization pin of at least one of said first and second input devices; and
    a clock signal connected to a clock pin of each of said input devices;
  wherein said signal processing device simultaneously sends and receives data from both of said input devices.

2. The system of claim 1, wherein said signal processing device sends said clock signal to each of said input devices.

3. A multi-chip signal processing system comprising:
  a first input device;
  a second input device; and
  a signal processing device having
    a data input line connected to an output of each of said first and second input devices;
    a data output line connected to an input of each of said first and second input devices;
    a first synchronization line connected to a synchronization pin of at least one of said first and second input devices;
    a second synchronization line connected to a synchronization pin of at least one of said first and second input devices; and
    a clock signal connected to a clock pin of each of said input devices;
  wherein said signal processing device sends and receives data from both of said input devices; and
  wherein said signal processing device and said second input device receive said clock signal from said first input device.

4. The system of claim 1, wherein a rate at which data is sampled from said first and second input devices may be programmably changed while in use.

5. The system of claim 1, wherein said first input device is an analog interface device.

6. The system of claim 1, wherein said signal processing device further comprises a first data register for storing data received on said input line and a second data register for storing data to be sent on said data output line.

7. The system of claim 1, wherein said first and second synchronization lines are used as frame-synchronization signals to distinguish data to or from each of said input devices.

8. The system of claim 1, wherein said signal processing device further comprises a control register for storing configuration data for said signal processing device.

9. The system of claim 8, wherein said configuration data includes identification information for said first and second analog devices.

10. The system of claim 8, wherein said configuration data includes a setting to force said clock signal to operate at one of several selectable frequencies.

11. The system of claim 8, wherein said configuration data includes a setting to indicate which of said input devices is currently sending or receiving data from said signal processing device.

12. A multi-chip signal processing system comprising:
  an input device;
  a signal processing device having
    a data input line connected to an output of said input device and to a second port;
    a data output line connected to an input of said input device and to said second port;
    a first synchronization line connected to a synchronization pin of said input device;
    a second synchronization line connected to said second port; and
    a clock signal connected to a clock pin of said input device and to said second port;
  wherein said signal processing device simultaneously sends and receives data from said input device.

13. A multi-chip signal processing system comprising:
  an input device;
  a signal processing device having
    a data input line connected to an output of said input device and to a second port;
    a data output line connected to an input of said input device and to said second port;
    a first synchronization line connected to a synchronization pin of said input device;
    a second synchronization line connected to said second port; and
    a clock signal connected to a clock pin of said input device and to said second port;
  wherein said signal processing device sends and receives data from said input device; and
  wherein said signal processing device receives said clock signal from said first input device.

* * * * *